United States Patent [19]

Condon

[11] Patent Number: 5,307,841
[45] Date of Patent: May 3, 1994

[54] TEST PLUG FOR WASTE PIPE

[75] Inventor: Duane R. Condon, Ramona, Calif.

[73] Assignee: Rectorseal Corporation, Houston, Tex.

[21] Appl. No.: 46,616

[22] Filed: Apr. 14, 1993

Related U.S. Application Data

[63] Continuation-in-part of Ser. No. 927,814, Aug. 10, 1992, abandoned.

[51] Int. Cl.⁵ .............................................. F16L 55/16
[52] U.S. Cl. ...................................... 138/90; 73/49.8; 220/237; 215/360; 138/89
[58] Field of Search ............... 4/295; 73/49.8; 138/89, 138/90; 220/234–238; 215/358–361, 364; 16/114 R, DIG. 30, DIG. 24

[56] References Cited

U.S. PATENT DOCUMENTS

| | | | |
|---|---|---|---|
| 1,623,843 | 4/1927 | Klinck | 220/235 |
| 1,808,411 | 6/1931 | Hinkston | 138/90 |
| 2,010,200 | 8/1935 | Rufener . | |
| 2,062,519 | 12/1936 | Ljungberg | 138/90 |
| 2,974,685 | 3/1961 | Ver Nooy | 138/90 |
| 3,444,898 | 5/1969 | Caple | 138/89 |
| 3,494,504 | 2/1970 | Jackson | 138/89 |
| 3,901,167 | 8/1975 | Reese | 138/89 |
| 4,160,612 | 7/1979 | Britton | 138/89 |
| 4,215,951 | 8/1980 | Knox | 405/203 |
| 4,248,271 | 2/1981 | Burgess | 138/89 |
| 4,401,228 | 8/1983 | Baldelli | 220/235 |
| 4,493,344 | 1/1985 | Mathison | 138/89 |
| 4,547,242 | 10/1985 | Tusinski | 220/235 |
| 4,614,206 | 9/1986 | Mathison | 138/93 |
| 4,634,151 | 1/1987 | Holt | 16/114 R |
| 4,817,671 | 4/1989 | Mathison | 138/90 |
| 5,044,403 | 9/1991 | Chen | 138/89 |

FOREIGN PATENT DOCUMENTS

| | | | |
|---|---|---|---|
| 593624 | 8/1925 | France | 215/360 |
| 313441 | 7/1953 | Switzerland | 138/89 |
| 317573 | 8/1929 | United Kingdom . | |
| 2117863 | 3/1983 | United Kingdom . | |
| 3807457 | 8/1988 | United Kingdom . | |

Primary Examiner—Philip R. Coe
Assistant Examiner—Terrence R. Till
Attorney, Agent, or Firm—Baker, Maxham, Jester & Meador

[57] ABSTRACT

A test plug for sealing a waste pipe includes a generally cylindrical piston having an inwardly tapered lower end with a maximum outer diameter slightly smaller than an inner diameter of a waste pipe. A threaded rod has a segment that extends through the unthreaded central bore of a cylindrical holder and has a lower end connected to the piston. A knob is screwed over the upper end of the rod. An elastomeric O-ring surrounds the tapered lower end of the piston and is deformable in a radially outward direction into sealing engagement with an inner wall of the waste pipe by expanding the O-ring over the tapered lower end of the piston. The knob is turned to pull the rod upwardly through the holder. This causes the lower end of the holder to push the O-ring downwardly over the tapered lower end of the piston, thereby expanding the O-ring against the inner wall of the pipe. A plurality of gripping teeth are pivotally mounted in slots formed at circumferentially spaced locations about the cylindrical holder. Cams on the inner ends of the teeth engage a complementary shaped receptacle in an outer wall of the piston for pivoting the teeth to engage the inner wall of the waste pipe. The knob is mounted over a radial retaining flange of the cylindrical holder to substantially prevent unrestricted upward movement of the piston as a result of high pressure fluid in the pipe acting on the circular face of the piston.

20 Claims, 2 Drawing Sheets

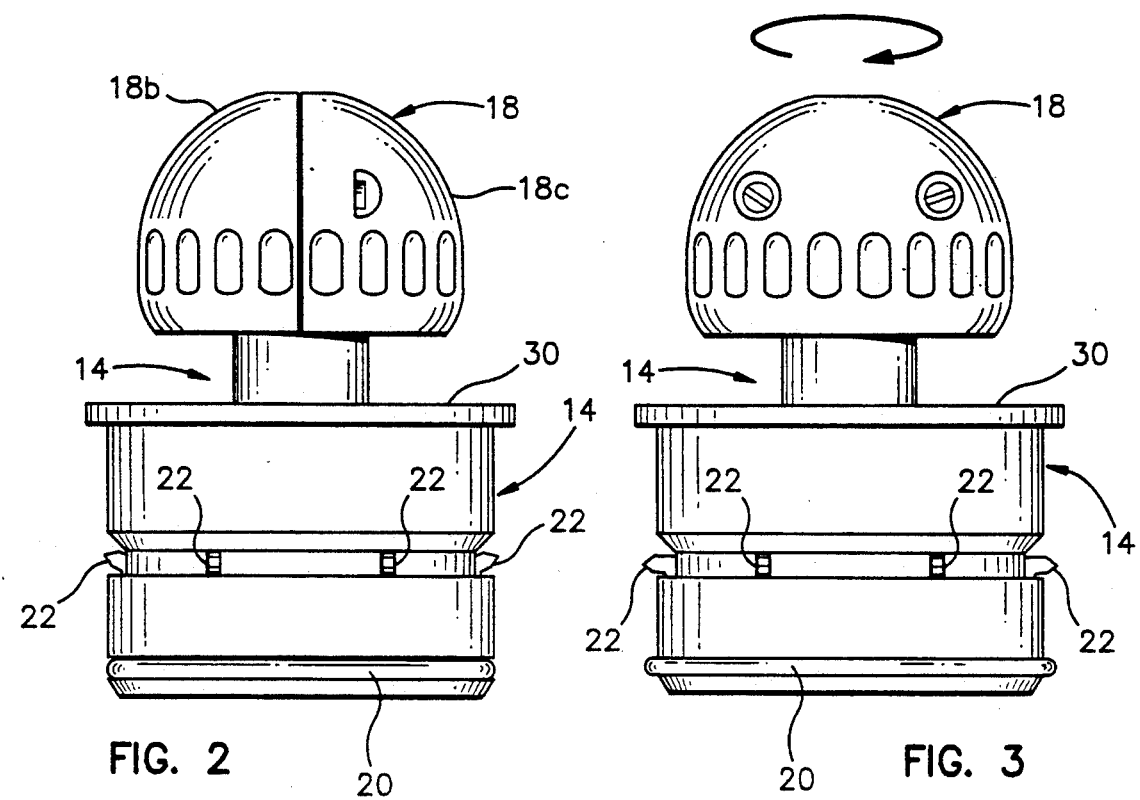
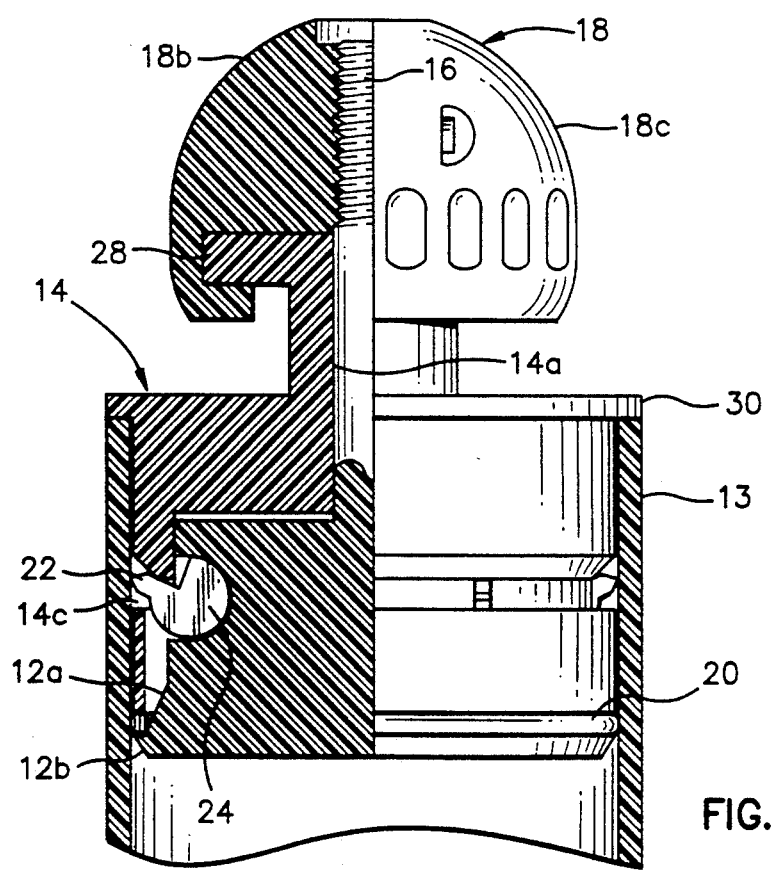

TEST PLUG FOR WASTE PIPE

CROSS-REFERENCE TO RELATED CASE

This application is continuation-in-part of my similarly entitled abandoned application Ser. No. 07/927,814 filed Aug. 10, 1992.

BACKGROUND OF THE INVENTION

The present invention relates to tools used by plumbers in residential and commercial building construction, and more particularly, to a device which may be inserted into a waste pipe in order to seal the pipe for pressure testing.

Drain/waste/vent (DWV) pipe and fittings made of acrylonitrile butadiene styrene (ABS) (Trademark) or polyvinyl chloride (PVC) plastic are extensively utilized in the construction of sewer systems in both residential and commercial construction. In some locations, cast iron pipe, copper pipe or clay pipe are used in constructing drain, waste or vent pipes in commercial and residential structures. Most municipalities have a plumbing code, such as the Uniform Plumbing Code (UPC), which requires that the sewer system in a residence or commercial building be capable of withstanding a predetermined internal pressure, typically between about five pounds per square inch and fifteen pounds per square inch, without any apparent leaks. In order to accomplish such a pressure test, it is necessary for each waste pipe to be sealed.

There have been several approaches for sealing waste pipes in order to accomplish a pressure test. One approach requires the insertion of an elastomeric plug into the waste pipe which is inflated against the walls of the pipe to effect a seal. See for example U.S. Pat. No. 4,614,206 of Mathison et al. These inflatable plugs are expensive and the inflation thereof is both time consuming and dangerous. Over-inflation can lead to explosions, which can injure the plumber.

An alternate approach is to glue a seal over the end of the waste pipe. The seal must later be broken out or a segment of the pipe cut off. This approach is expensive and time consuming. Frequently the broken out seal lodges in the waste pipe, causing plugging.

Yet another approach to sealing a waste pipe is to utilize a type of mechanical plug called a "dollar plug". See for example U.S. Pat. No. 4,493,344 of Mathison et al. This plug has a large wing nut which is turned by the plumber in order to squeeze an elastomeric O-ring member between plate members. The O-ring member is expanded against the internal walls of the waste pipe. These dollar plugs provide an unreliable seal, and are time consuming to install and remove. Also, repeated use of dollar plugs is sometimes impaired because they rust and become encrusted with grout and other debris.

U.S. Pat. No. 4,817,671 of Mathison et al. discloses a high pressure mechanical plug that uses a combination of an expanded elastomeric O-ring and circumferential gripping pins to seal a pipe. An open-ended hollow cylindrical body encloses a piston structure having a lower end wall and frustoconical ram. A draw bolt extends axially from the piston structure through an unthreaded hole in a top end plate connected to the cylindrical body. A nut threaded on this bolt is tightened to pull the piston structure upwardly into the cylindrical body, thereby squeezing the O-ring between the piston structure and a tapered lower end of the cylindrical body. The O-ring is expanded radially outwardly against the inner wall of the pipe to provide a fluid-impervious seal. At the same time, circumferentially spaced locking pins are engaged by the sloping wall of the frustoconical ram and pushed radially outward into gripping engagement with the inner wall of the pipe. This plug is specifically designed so that even after the nut is tightened, high pressure gas or water inside the pipe pushes against the lower end of the piston structure to further move the same upwardly. This further squeezes the O-ring and further moves the pins radially outwardly in order to "further secure" the plug in the pipe.

The plug of the aforementioned U.S. Pat. No. 4,817,671 of Mathison et al. has several disadvantages. The mechanical structure of this plug has many complex metal parts which are expensive to fabricate and assemble. These metal parts are subject to corrosion. Furthermore, when testing a large diameter plastic or clay pipe, e.g. a pipe having a diameter of six inches or more, the pins can push radially outwardly with enough force to fracture the pipe. This is because the piston structure is capable of unrestricted free upward movement toward the cylindrical body. After the nut is tightened, high fluid pressures within the pipe can urge the piston structure upwardly with sufficient axial force such that the resulting radial force on the pins exceeds the strength of the pipe.

SUMMARY OF THE INVENTION

It is therefore the primary object of the present invention to provide an improved test plug that may be readily installed in a waste pipe to provide a fluid impervious seal to allow the associated sewer system to be tested.

According to my invention, a test plug for sealing a waste pipe includes a generally cylindrical piston having an inwardly tapered lower end with a maximum outer diameter slightly smaller than an inner diameter of a waste pipe. A threaded rod has a segment that extends through the unthreaded central bore of a cylindrical holder and has a lower end connected to the piston. A knob is screwed over the upper end of the rod. An elastomeric O-ring surrounds the tapered lower end of the piston and is deformable in a radially outward direction into sealing engagement with an inner wall of the waste pipe by expanding the O-ring over the tapered lower end of the piston. The knob is turned to pull the rod upwardly through the holder. This causes the lower end of the holder to push the O-ring downwardly over the tapered lower end of the piston, thereby expanding the O-ring against the inner wall of the pipe. A plurality of gripping teeth are pivotally mounted in slots formed at circumferentially spaced locations about the cylindrical holder. Cams on the inner ends of the teeth engage a complementary shaped receptacle in an outer wall of the piston for pivoting the teeth to engage the inner wall of the waste pipe. The knob is mounted over a radial retaining flange of the cylindrical holder to substantially prevent unrestricted upward movement of the piston as a result of high pressure fluid in the pipe acting on the circular face of the piston.

BRIEF DESCRIPTION OF THE DRAWINGS

FIGS. 2 and 3 are side elevational views of the preferred embodiment of my test plug with its sealing O-ring contracted, and radially expanded, respectively.

FIG. 4 is an enlarged part vertical sectional view, part elevational view of the preferred embodiment of my test plug installed in a waste pipe.

DESCRIPTION OF THE PREFERRED EMBODIMENT

Figure 1:
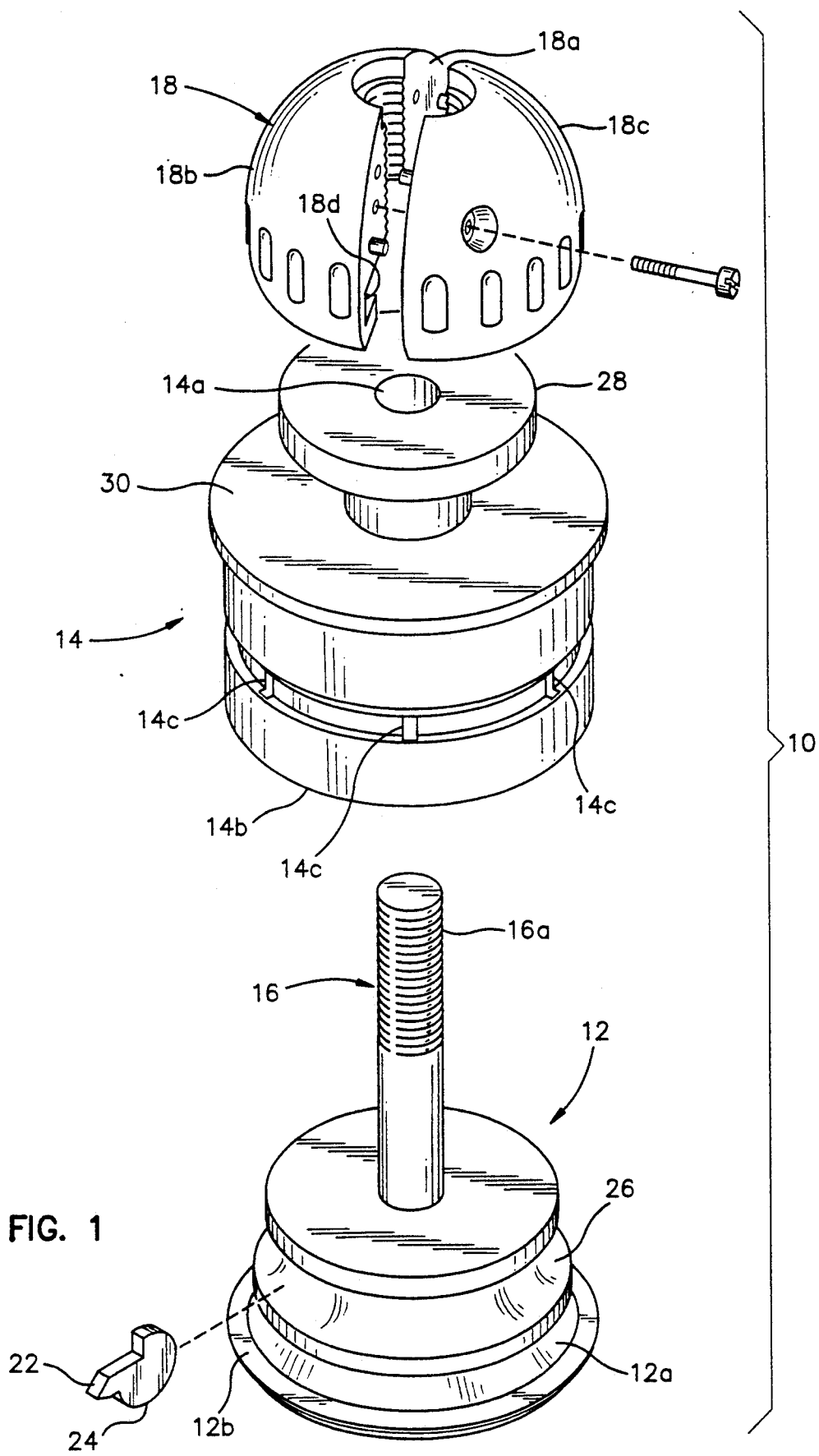
FIG. 1 is an enlarged, exploded perspective view of a preferred embodiment of my test plug.

Referring to FIG. 1, a first embodiment of my test plug 10 includes a generally cylindrical piston 12 having an inwardly tapered lower end 12a (FIG. 4) with a maximum outer diameter slightly smaller than an inner diameter of a standard ABS plastic waste pipe 13. The test plug 10 further includes a hollow, generally cylindrical holder 14 (FIG. 1) having an unthreaded central bore 14a (FIG. 4). A rod 16 (FIG. 1) is slidingly received through the bore 14a of the cylindrical holder 14. The rod has an upper threaded segment 16a. A lower end of the rod 16 is connected to the center of the piston 12.

A hemispherically shaped knob 18 (FIG. 1) is connected to an upper end of the rod 16. The knob 18 has a threaded central bore 18a through which the upper threaded segment 16a of the rod 16 is screwed. Preferably the knob 18 is made of two half sections 18b and 18c which are held together by screws 19. The knob 18 may be rotated in a clockwise direction over the threaded segment 16a of the rod 16 in order to pull the rod 16 upwardly through the unthreaded bore 14a in a longitudinal direction relative to the cylindrical holder 14. The clockwise direction of rotation of the knob 18 is illustrated by the arrow in FIG. 3. Counter-clockwise rotation of the knob 18 pushes the rod 16 downwardly through the bore 14a in the cylindrical holder 14.

An elastomeric O-ring 20 (FIG. 4) surrounds the tapered lower end 12a of the piston 12. The O-ring 20 is deformable in a radially outward direction into sealing engagement with an inner wall of the waste pipe 13. This is accomplished by rotating the knob 18 clockwise to pull the piston 12 upwardly and push the O-ring 20 against the lower end 14b (FIG. 1) of the cylindrical holder 14. This forces the O-ring 20 downwardly along the tapered lower end 12a of the piston 12, causing it to expand radially against the inner wall of the pipe 13. The tapered lower end 12a of the piston includes a radially extending shoulder 12b (FIG. 1) for retaining the O-ring to prevent it from being pushed off of the tapered lower end 12a of the piston 12.

FIG. 2 shows the knob 18 unscrewed and the smaller diameter of the O-ring 20. FIG. 3 shows the knob 18 after having been screwed in the clockwise direction indicated by the arrow to expand the O-ring 20 radially outwardly.

A plurality of gripping teeth 22 (FIG. 2) are pivotally mounted at circumferentially spaced locations about the piston 12. The teeth extend through vertical slots 14c (FIG. 4) in the holder 14 and have pointed distal ends which engage the inner wall of the pipe 13 to anchor the test plug. This helps prevent fluid pressure in the pipe from blowing out the plug. Linkage means are provided for pivoting the teeth 22 to engage and disengage the inner wall of the waste pipe when the knob is rotated in a clockwise direction to expand the O-ring and then counter-clockwise to release the O-ring back to its smaller diameter configuration. The linkage means includes a circular cam 24 (FIG. 4) connected to a proximal end of each of the teeth 22. Each of the cams 24 is mounted in a complementary shaped circular cam receptacle 26 (FIG. 1) formed in an outer wall of the piston 12. The cam receptacle is a continuous rounded groove formed in the exterior of the piston 12. Relative motion between the holder 14 and the piston 12 causes the cams 24 to rotate so that the teeth 22 move 'rom their retracted positions illustrated in FIG. 2 to their extended positions illustrated in FIG. 3.

The cylindrical holder 14 includes a retaining flange 28 which extends radially from an upper end thereof. The retaining flange 28 is captured inside an annular recess 18d formed in the half sections 18b and 18c of the knob 18. The knob 18 can rotate relative to the flange 18. The rotatable coupling between the knob 18 and retaining flange 28 serves to substantially prevent any vertical motion of the knob 18 relative to the holder. As explained hereafter in greater detail, this rotatable coupling substantially prevents expansion of the O-ring 20 or outward radial movement of the gripping teeth 22 as a result of high fluid pressure acting on the circular face of the piston 12.

The cylindrical holder 14 has a seating flange 30 (FIG. 1) that extends radially therefrom for engaging an upper end of the waste pipe 13. This establishes a sealing position of the plug 10 relative to the waste pipe 13.

When the plug 10 is installed in the pipe 13 in the manner illustrated in FIG. 4, the knob 18 can be rotated clockwise to lock the plug in place. The O-ring 20 is radially expanded against the inner wall of the pipe 13. The ends of the teeth 22 also engage and grip the inner wall of the pipe 13.

After the test plug 10 is installed in the pipe 13, the plumber rotates the knob 18 until he or she detects firm resistance. The waste pipe 13 can then be pressurized from another location. Air or water pressure within the pipe 13 pushes upwardly against the piston 12. The tolerances between the annular recess 18d and the retaining flange 28 are very close to permit rotation of the knob 18 relative to the retaining flange 28 while preventing any substantial upward or downward movement of the piston 12, except upon rotation of the knob. There is no additional expansion of the O-ring 20 or radial movement of the gripping teeth 22 as a result of high fluid pressure acting on the circular face of the piston 12. The strength of the seal between the O-ring 20 and the inner wall of the pipe 13 and the amount of gripping force of the teeth 22 is solely determined by the amount of rotation of the knob 18. Fracture or other physical damage to the pipe 13 is thus avoided.

Preferrably all of the parts of the preferred embodiment, except for the screws 19, the O-ring 20 and the teeth 22, are injection molded from suitable plastic, such as ABS or high density polyethylene (HDPE). My test plug works well with ABS, PVC, cast iron, copper, clay and other types of pipe conventionally used by plumbers.

While I have described a preferred embodiment of my test plug, it will be apparent to those skilled in the art that my preferred embodiment may be modified in both arrangement and detail without departing from the spirit of my invention. For example, the rod could have a passage the full length thereof and could incorporate a valve for pressurizing the waste pipe or releasing air or water pressure in the waste pipe. The cams 24 could be replaced with gear segments and the cam receptacle 26 could be replaced with rack gear segments. The configuration of the piston, rod, cylindrical holder and knob could be varied significantly from the designs illustrated. The O-ring could overlie a tapered outer surface of the cylindrical holder and could be moved up and down by a return shoulder of the piston. The piston could be spring loaded to facilitate release of the teeth from the inner wall of the pipe. Therefore, the protection afforded my invention should only be limited in accordance with the scope of the following claims.

I claim:

1. A test plug for a pipe, comprising:
    a generally cylindrical piston having a lower end which tapers in an inward direction moving in an upward direction, the tapered lower end having a maximum outer diameter that is slightly smaller than an inner diameter of a pipe;
    a generally cylindrical holder having a central axially extending bore and a downwardly opening interior in which the piston is slidably received;
    a rod having an upper threaded segment, an intermediate segment that extends through the bore of the cylindrical holder, and a lower end connected to an upper end of the piston;
    a knob screwed over the upper threaded segment of the rod for pulling the rod upwardly through the bore upon rotation of the knob in a first direction, and for pushing the rod downwardly through the bore upon rotation of the knob in a second direction opposite the first direction;
    means rotatably coupling the knob and the cylindrical holder to substantially prevent any upward or downward movement of the knob relative to the holder;
    an elastomeric O-ring surrounding the tapered lower end of the piston and deformable in a radially outward direction into sealing engagement with an inner wall of the pipe by radially expanding the O-ring upon rotation the knob in the first direction to pull the piston upwardly into the interior of the cylindrical holder to thereby push the O-ring downwardly over the tapered lower end of the piston;
    a plurality of gripping teeth pivotally mounted at circumferentially spaced locations about the cylindrical holder; and
    linkage means for pivoting the teeth in an outward direction to engage the inner wall of the pipe upon rotation of the knob in the first direction and for pivoting the teeth in an inward direction to disengage the inner wall of the pipe upon rotation of the knob in the second direction;
    whereby high fluid pressure within the pipe acting against a circular face of the piston will not result in movement of the gripping teeth in the outward direction.

2. A test plug according to claim 1 wherein the coupling means includes a retaining flange extending radially from an upper end of the cylindrical holder, said flange being captured within an inwardly opening recess formed in the knob.

3. A test plug according to claim 1 wherein the linkage means includes a cam connected to a proximal end of each of the teeth, each of the cams being mounted in a complementary shaped cam receptacle formed in an outer wall of the piston.

4. A test plug according to claim 1 wherein the tapered lower end of the piston includes a radially extending shoulder for retaining the O-ring.

5. A test plug according to claim 1 wherein the cylindrical holder has a plurality of circumferentially spaced slots through which the teeth extend.

6. A test plug according to claim 1 wherein the cylindrical holder is dimensioned to fit within the pipe and has a seating flange that extends radially therefrom for engaging an upper end of the waste pipe to establish a sealing position of the plug relative to the pipe.

7. A test plug according to claim 1 wherein the knob is formed of a pair of half sections held together by a plurality of screws.

8. A test plug according to claim 1 wherein the knob has a hemispherical shape.

9. A test plug according to claim 1 wherein the cylindrical holder has a seating flange that extends radially therefrom for engaging an upper end of the waste pipe to establish a sealing position of the plug relative to the pipe and the coupling means includes a retaining flange extending radially from an upper end of the cylindrical holder, said flange being captured within an inwardly opening recess formed in the knob.

10. A test plug according to claim 1 wherein the cylindrical holder, piston, rod and knob are made of injection molded plastic.

11. A test plug for a pipe, comprising:
    a generally cylindrical piston having a lower end which tapers in an inward direction moving in an upward direction, the tapered lower end having a maximum outer diameter that is slightly smaller than an inner diameter of a pipe;
    a generally cylindrical holder having a central axially extending bore and a downwardly opening interior in which the piston is slidably received;
    a rod having an upper threaded segment, an intermediate segment that extends through the bore of the cylindrical holder, and a lower end connected to an upper end of the piston;
    a knob screwed over the upper threaded segment of the rod for pulling the rod upwardly through the bore upon rotation of the knob in a first direction, and for pushing the rod downwardly through the bore upon rotation of the knob in a second direction;
    an elastomeric O-ring surrounding the tapered lower end of the piston and deformable in a radially outward direction into sealing engagement with an inner wall of the pipe by radially expanding the O-ring upon rotation the knob in the first direction to pull the piston upwardly into the interior of the cylindrical holder to thereby push the O-ring downwardly over the tapered lower end of the piston;
    a plurality of gripping teeth pivotally mounted at circumferentially spaced locations about the cylindrical holder;
    linkage means for pivoting the teeth in an outward direction to engage the inner wall of the pipe upon rotation of the knob in the first direction, the linkage means including a cam connected to a proximal end of each of the teeth, each of the cams being mounted in a complementary shaped cam receptacle formed in an outer wall of the piston; and
    means rotatably coupling the knob and the cylindrical holder to substantially prevent any upward or downward movement of the knob relative to the cylindrical holder;
    whereby high fluid pressure within the pipe acting against a circular face of the piston will not result in movement of the gripping teeth in the outward direction.

12. A test plug according to claim 11 wherein the coupling means includes a retaining flange extending radially from an upper end of the cylindrical holder, said flange being captured within an inwardly opening recess formed in the knob.

13. A test plug according to claim 11 wherein the cylindrical holder has a plurality of circumferentially spaced slots through which the teeth extend.

14. A test plug according to claim 11 wherein the cylindrical holder has a seating flange that extends radially therefrom for engaging an upper end of the waste pipe to establish a sealing position of the plug relative to the pipe.

15. A test plug according to claim 11 wherein the cylindrical holder has a seating flange that extends radially therefrom for engaging an upper end of the waste pipe to establish a sealing position of the plug relative to the pipe and the coupling means includes a retaining flange extending radially from an upper end of the cylindrical holder, said flange being captured within an inwardly opening recess formed in the knob.

16. A test plug for a pipe, comprising:
    a generally cylindrical piston having a lower end which tapers in an inward direction moving in an upward direction, the tapered lower end having a maximum outer diameter that is slightly smaller than an inner diameter of a pipe;
    a generally cylindrical holder having a central axially extending bore and a downwardly opening interior in which the piston is slidably received;
    a rod having an upper threaded segment, an intermediate segment that extends through the bore of the cylindrical holder, and a lower end connected to an upper end of the piston;
    a knob screwed over the upper threaded segment of the rod for pulling the rod upwardly through the bore upon rotation of the knob in a first direction;
    an elastomeric O-ring surrounding the tapered lower end of the piston and deformable in a radially outward direction into sealing engagement with an inner wall of the pipe by radially expanding the O-ring upon rotation the knob in the first direction to pull the piston upwardly into the interior of the cylindrical holder to thereby push the O-ring downwardly over the tapered lower end of the piston;
    a plurality of gripping teeth pivotally mounted at circumferentially spaced locations about the cylindrical holder; and
    linkage means for pivoting the teeth in an outward direction to engage the inner wall of the pipe upon rotation of the knob in the first direction, the linkage means including a cam connected to a proximal end of each of the teeth, each of the cams being mounted in a complementary shaped cam receptacle formed in an outer wall of the piston.

17. A test plug according to claim 16 and further comprising means rotatably coupling the knob and the cylindrical holder to substantially prevent any upward or downward movement of the knob relative to the cylindrical holder.

18. A test plug according to claim 17 wherein the coupling means includes a retaining flange extending radially from an upper end of the cylindrical holder, said flange being captured within an inwardly opening recess formed in the knob.

19. A test plug according to claim 17 wherein the cylindrical holder has a seating flange that extends radially therefrom for engaging an upper end of the waste pipe to establish a sealing position of the plug relative to the pipe and the coupling means includes a retaining flange extending radially from an upper end of the cylindrical holder, said flange being captured within an inwardly opening recess formed in the knob.

20. A test plug according to claim 16 wherein the cylindrical holder has a plurality of circumferentially spaced slots through which the teeth extend.

* * * * *